(12) United States Patent
Achten et al.

(10) Patent No.: US 12,036,737 B2
(45) Date of Patent: Jul. 16, 2024

(54) FILM AREAS FUNCTIONALIZED BY MEANS OF 3D PRINTING FOR FINISHING WORKPIECE SURFACES

(71) Applicant: STRATASYS, INC., Eden Prairie, MN (US)

(72) Inventors: Dirk Achten, Leverkusen (DE); Nicolas Degiorgio, Krefeld (DE); Jonas Kuenzel, Leverkusen (DE); Jari Birth, Cologne (DE); Thomas Buesgen, Leverkusen (DE)

(73) Assignee: Stratasys, Inc., Eden Prairie, MN (US)

( * ) Notice: Subject to any disclaimer, the term of this patent is extended or adjusted under 35 U.S.C. 154(b) by 441 days.

(21) Appl. No.: 17/291,669

(22) PCT Filed: Dec. 2, 2019

(86) PCT No.: PCT/EP2019/083301
§ 371 (c)(1),
(2) Date: May 6, 2021

(87) PCT Pub. No.: WO2020/114963
PCT Pub. Date: Jun. 11, 2020

(65) Prior Publication Data
US 2022/0001619 A1 Jan. 6, 2022

(30) Foreign Application Priority Data
Dec. 6, 2018 (EP) ..................................... 18210888

(51) Int. Cl.
*B29C 64/30* (2017.01)
*B29C 51/02* (2006.01)
(Continued)

(52) U.S. Cl.
CPC ............. *B29C 64/30* (2017.08); *B29C 51/02* (2013.01); *B29C 51/14* (2013.01); *B29C 64/118* (2017.08); *B33Y 10/00* (2014.12); *B33Y 40/20* (2020.01)

(58) Field of Classification Search
CPC ......... B29C 64/30; B29C 51/02; B29C 51/14; B29C 64/118; B29C 64/106; B29C 63/48;
(Continued)

(56) References Cited

U.S. PATENT DOCUMENTS

| 4,779,390 A | 10/1988 | Repper et al. |
| 8,535,036 B2 | 9/2013 | Hopkinson et al. |

(Continued)

FOREIGN PATENT DOCUMENTS

| CN | 107522827 A | 12/2017 |
| DE | 19814956 A1 | 10/1999 |

OTHER PUBLICATIONS

International Search Report, PCT/EP2019/083301, dated Apr. 8, 2020, Authorized officer: Dominik Schneider.

*Primary Examiner* — S. Behrooz Ghorishi
(74) *Attorney, Agent, or Firm* — Faegre Drinker Biddle & Reath LLP (57) ABSTRACT

The present invention relates to a method for functionalizing a workpiece surface, comprising the following steps: a) providing a workpiece; b) providing a film; c) functionalizing at least one film side by the location-selective application of a functionalization composition comprising a polymer material onto part of the film side in one or more layers by means of a 3D printing process; d) creating an integrally bonded or interlocking connection between the workpiece surface and the film functionalized in step c) by bringing the film into contact with at least part of the workpiece surface, wherein the integrally bonded or interlocking connection to the workpiece surface is achieved with a functionalized film (Continued)

side. The invention further relates to workpieces having a surface functionalized according to the invention.

14 Claims, 1 Drawing Sheet (51) Int. Cl.
 *B29C 51/14* (2006.01)
 *B29C 64/118* (2017.01)
 *B33Y 10/00* (2015.01)
 *B33Y 40/20* (2020.01)

(58) Field of Classification Search
 CPC ... B29C 35/02; B29C 37/0025; B29C 64/112; B29C 64/153; B29C 64/245; B33Y 10/00; B33Y 40/20; B33Y 30/00; B33Y 40/00; B29B 13/023; B29L 2031/3005
 See application file for complete search history.

(56) References Cited

U.S. PATENT DOCUMENTS

| | | | |
|---|---|---|---|
| 8,994,592 B2 | 3/2015 | Scott et al. | |
| 9,815,241 B2 | 11/2017 | Pforte et al. | |
| 2015/0273757 A1* | 10/2015 | Pforte | B29C 65/48 428/172 |
| 2017/0210063 A1* | 7/2017 | Andres | B29C 65/4825 |

\* cited by examiner

FILM AREAS FUNCTIONALIZED BY MEANS OF 3D PRINTING FOR FINISHING WORKPIECE SURFACES

CROSS-REFERENCE TO RELATED APPLICATION

This application is a national stage application under 35 U.S.C. § 371 of PCT/EP2019/083301, filed Dec. 2, 2019, which claims the benefit of European Application No. 18210888.6, filed Dec. 6, 2018, each of which is incorporated herein by reference.

FIELD

The present invention relates to a process for the functionalization of a workpiece surface, comprising the steps of: a) provision of a workpiece; b) provision of a film; c) functionalization at least of one film side by locationally selective application of a functionalization composition comprising a polymeric material by means of a 3D printing process in one or more layers onto a portion of the film side; d) bringing the film into contact with at least one portion of the workpiece surface for development of a coherent or interlocking connection between the workpiece surface and the film functionalized in step c), the coherent or interlocking connection to the workpiece surface being achieved with a functionalized film side. The invention further relates to workpieces with a surface functionalized according to the invention.

BACKGROUND

The advantages of mass production in relation to quality and costs can in particular be utilized when large numbers of units of components of identical design are manufactured. However, this concept has the disadvantage that individualization of said components within the existing process can be achieved only at high technical cost. The literature therefore discusses many approaches to maximizing of efficiency in achievement of different designs which by way of example have different functionalities or decorative effects, in a manner based on a single production standard and within separate process steps. This approach combines the advantages of basic mass production with the desired component-flexibility, and is in particular attractive for modifications of workpiece surfaces, because changes to the underlying structure of the component are understandably significantly more complicated.

By way of example, it is known that decorative or functional elements can be combined with plastics components in that film plies with such elements are included into injection moldings. Within the process, a film ply is inserted into an injection mold and fixed in said mold. A plastics composition is then injected into the injection mold, where it bonds to the film ply and hardens. Such processes are termed in-mold decoration (IMD) processes. However, this procedure has the disadvantage that the high temperatures and pressures required for injection molding restrict the selection of possible materials that can be used. In particular it is not possible to use heat-sensitive electronic functional elements or decorative effects, because these would suffer irrevocable damage under the conditions of injection molding. Alongside high production costs for the injection molding, the above processes also lack flexibility, because injection molding can usually be carried out only with a composition that is to some extent homogeneous.

The patent literature also reveals possibilities for altering surface properties of consumer goods.

EP 011 87 96 A2 discloses an interior cladding component in particular for vehicles with a support which has film-laminated sections on the visible side and has at least one adjacent region covered with fabric or leather or a similar material, with, at the boundary between film and fabric, a groove is configured in the support, into which groove the edges of the film and of the fabric have been inserted and held there by adhesive bonding and/or by gripping.

DE 198 149 56 A1 describes a process for the production of motor-vehicle-interior claddings with a support which, on the side that is visible in the installed position, has been covered with a film, where polyurethane foam backing has been inserted in at least some sections between the film and the support, where the process comprises: 1) production of the film with over-dimensioning inclusive of an overwrap at the edges by thermoforming or the like; 2) trimming of the film to the desired final dimensions; 3) insertion of the air-permeable support into the film inclusive of insertion under pressure into the overwrapped edges; 4) insertion of this composite into the lower portion of a foaming mold and fixing by vacuum; 5) moving the upper portion of the foaming mold into place and thereby complete overwrapping of the edges of the film to the desired final shape; 6) introduction of the polyurethane into the closed mold to produce the foam backing and adhesive bonding of the film to the support in regions including the curved edges.

A very wide variety of processes in the additive manufacturing sector have also been described.

WO 2010 049 696 A2 discloses by way of example a device for the formation of a three-dimensional article by layer-by-layer addition of a construction material having a supportive structure for the support of the article during the shaping procedure and a removable underlying metallic layer which takes the form of a mesh, a foil, a foil or a foil. The base layer is fixed removably on the construction support.

DE 10 2014 104 321 A1 moreover describes a process for the production of a molding with the steps of: a) provision of a film ply; b) application of a plastics composition in a prescribed three-dimensional shape to the film ply by means of a three-dimensional printing process.

Despite the processes already known in the field of functionalization of workpiece surfaces, there continues to be increased interest in processes which can provide a very wide variety of functionally modified surfaces at high production speeds.

SUMMARY

Therefore the object of the present invention is to provide a flexible and inexpensive process for the production of functionalized workpiece surfaces.

The following are therefore proposed: a process for the functionalization of workpiece surfaces as claimed in claim 1, and workpieces as claimed in claim 14, functionalized by said process. Advantageous further developments are stated in the dependent claims. They can be combined in any desired manner, unless the opposite is clearly apparent from the context.

The invention provides a process for the functionalization of a workpiece surface, where the process comprises at least the following steps:
a) provision of a workpiece;
b) provision of a film with at least two film sides, preferably with precisely two film sides;

c) functionalization of at least one film side by location-selective application of a functionalization composition comprising a polymeric material by means of a 3D printing process in one or more layers onto at least one portion of the at least one film side;

d) bringing the film into contact with at least one portion of the workpiece surface for development of a coherent or interlocking connection between at least one portion of the workpiece surface and the film functionalized in step c), the coherent or interlocking connection to the workpiece surface being achieved here with a functionalized film side.

BRIEF DESCRIPTION OF THE DRAWINGS

Various features and characteristics of the inventions described in this specification may be better understood by reference to the accompanying figures, in which.

DETAILED DESCRIPTION

It has been found that by means of the process of the invention it is possible to provide a very wide variety of functions to a large number of different workpiece surfaces. The process is not restricted here to specific geometries of the workpieces, and the process of the invention can also apply sensitive mechanical or electrical functions to complex surface geometries. The applied functionalities are advantageously located between the workpiece surface and the film, and these are therefore shielded by the film from undesired environmental effects. The film therefore provides mechanical protection which increases the durability of the applied functionalities. This is in particular advantageous in comparison with the prior art which to some extent recommends the application of functional elements to the uppermost surface of the workpiece. In such cases the film disadvantageously provides no mechanical protection. Another advantage is that the functionalization procedure can be decoupled from the production of the workpiece. It is therefore possible to continue use of existing standard production processes for the workpiece. The functionalization becomes chronologically independent of the manufacture of the workpiece, and it is possible to provide individual and varying functionalities as desired by customers. This reduces costs, accelerates production and avoids unnecessary holding of inventory of prefabricated components.

By means of the process of the invention it is possible to achieve functionalization of a workpiece surface. Workpiece surfaces here are the surfaces of any desired workpieces, where the workpieces can be composed of various materials such as plastic, glass, ceramic, thermoplastic polymers, thermoplastic elastomers, crosslinked rubber materials, thermoset materials, composite substances, composites, wood, metal, carbon, cork or paper. No limits are imposed on use in various workpiece sectors, and the workpieces can therefore derive from vehicle construction, from aerospace technology, from the consumer goods sector or from safety or security engineering, etc. Examples of suitable workpieces are workpieces with a surface area greater than 1 $cm^2$, preferably greater than 10 $cm^2$, and moreover preferably workpieces with a surface area greater than 50 $cm^2$. Examples of suitable workpieces are dashboards for automobile engineering, electronics items such as radios, remote controls, lamps, smartphones, small electrical items such as toothbrushes, shavers, etc., and also non-electronic items such as book spines, razors, mechanical toothbrushes, other brushes or combinations of least two thereof.

The functionalization of the workpiece surface comprises the addition of further or additional elements which are perceptible by haptic or optical means to a user and which alter the perceived haptic, tactile or optical properties of the workpiece surface, or which are externally initially not perceptible, but provide new possible uses to the workpiece. Application of a 3D-printed film by lamination can by way of example alter the geometric design of a workpiece in a controlled manner (printed shaping). Application of a 3D-printed film by lamination can alter the haptic properties of a workpiece surface in a controlled manner (printed textures/printed pads/foams). Application of the 3D-printed film can alter the mechanical properties of a workpiece, for example the mechanical stiffness, or the flexibility. Application of a 3D-printed film by lamination can alter the electrical properties of a workpiece in a controlled manner. (printed conductors/circuit boards, antenna structures, electrical or electronic components, sensors, inductive or capacitive touch sensors, chips, display elements, in particular LED display elements or OLED display elements or LCD display elements). Application of a 3D-printed film by lamination can alter the optical properties of a workpiece in a controlled manner. (printed lenses, optical elements, inscription, decorative effects, safety or security features). The process of the invention can be used for additional provision of one or all of these examples of functionalities to a standard component.

In step a) a workpiece is provided. The manner of provision of the workpiece here can be such that at least the surface of the workpiece is freely accessible. Before or during provision, the workpiece surface can moreover be prepared for the further steps by other process steps such as cleaning, electrostatic discharging or demagnetizing, or temperature-adjustment.

In step b) a film is provided. In the context of the invention, the word "film" means a semifinished product which has a substantially greater extent in two spatial directions than in the third spatial direction. In the context of the invention, the word "film" also means areal semifinished products which are otherwise frequently termed textiles, woven fabrics, laid scrims, braided fabrics, meshes, knitted fabrics, foams, and also polymer films. It is essential to the invention that the film has a modulus-to-film-thickness ratio which allows the film to be wound around a core of diameter 10 cm without fracture of the material. The modulus of the films is determined here as modulus of elasticity in the tensile test on a 2*10 cm sample with a certain thickness, and according to the invention is in a range from 10 MPa to 10 GPa, where the film thickness is in a range from 0.01 to 2 mm. The product of film thickness and film modulus of the film is preferably in the form of thickness [mm]*modulus [MPa]<5000, preferably <3000, particularly preferably <2000 mm MPa, and the elongation at break of the film in the tensile test is preferably >5%, preferably >10% and particularly preferably >20%, measuring in accordance with DIN EN ISO 527-2:2012-06. The film here can have one or more layers made of one, or of a composite of different, film material(s). The film material is an entirely areal material, optionally also with cutouts, or takes the form of laid scrim, mesh, or woven fabric. The material is preferably selected from the group consisting of leather, polymers, composite materials, metals, wood, or combinations of at least two thereof. The film material is preferably selected from the group consisting of polyurethane, polycarbonate, polyester, polyamide, polyetherimide, polyetherketone, polyimide, polyoxymethylene, polysilicone, thermoplastic elastomer, rubber, polyvinyl chloride, polyethylene, polypropylene, fiber-composite materials with continuous fibers, or mixtures of at least two thereof or layer structures made of at least two thereof. The film material can be continuous, but can also have cutouts. The provision of the film preferably likewise comprises preparative steps such as cleaning, conditioning via application of further substances such as lacquers, electrostatic treatment steps, temperature-adjustment, etc. The film can be partially transparent or colored, or can have a printed decorative effect.

In step c) at least one film side is functionalized by locationally selective application of a functionalization composition comprising a polymeric material by means of a 3D printing process in one or more layers onto a portion of the film side.

The present invention thus also comprises, in parts, a process for the production of functionalization by means of additive manufacturing on a film. The functionalization to be produced is not in principle subject to any restriction here. In particular, additive manufacturing permits, in an effective manner, production of a very wide variety of functionalizations for a very wide variety of applications with unrestricted geometries. Correspondingly, the functionalization to be produced is also not subject to any restriction; instead, the process step described here can in principle serve to create any functionalization that can be produced by an additive process. However, the process described here is particularly preferably intended for those functionalizations that require high stability and, respectively, homogeneous mechanical properties.

3D printing processes comprise in particular additive processes. In principle it is possible for the purpose of this process step to use any additive process.

The expression "additive manufacturing processes" denotes those processes that construct articles layer-by-layer. They therefore differ significantly from other processes for the production of articles, for example milling or drilling. In the latter processes, an article is subjected to operations in which its final geometry results from removal of material.

Additive manufacturing processes utilize various materials and process techniques for layer-by-layer construction of articles. In what is known as fused deposition modeling (FDM) by way of example, a thermoplastic wire is liquefied and, with the aid of a nozzle, is deposited layer-by-layer on a movable construction platform. Solidification produces a solid article. Control of the nozzle and/or on the film to be printed is achieved on the basis of a CAD drawing of the article. If the geometry of the functionalization is complex, for example with geometric undercuts, supportive materials must be additionally concomitantly printed, and in turn removed after completion of the functionalization.

Alongside the above there are additive manufacturing processes which utilize thermoplastic powders in order to construct the desired functionalizations layer-by-layer. These use what is known as a "coater" to apply thin powder layers, which are then selectively melted by means of an energy source. The surrounding powder here supports the geometry of the component. This method is more cost-effective than the FDM process described above for manufacture of complex functionalizations. It is moreover possible to arrange and, respectively, manufacture various functionalizations in close-packed format in what is known as the powder bed. By virtue of these advantages, powder-based additive manufacturing processes are the most cost-effective additive production processes available in the market. Industrial users therefore mainly use these processes. Examples of powder-based additive manufacturing processes are what is known as laser sintering (SLS, selective laser sintering) and high-speed sintering (HSS). These differ from one another in the method used to introduce the selective-melting energy into the plastic. In the case of the laser sintering process, the energy is introduced by way of a deflected laser beam. In the case of what is known as the high-speed sintering (HSS) process, for example as described in EP 1 648 686, the energy is introduced by way of infrared (IR) radiant sources in combination with an IR absorber selectively printed into the powder bed. The method known as selective heat sintering (SHS) utilizes the printing unit of a conventional thermal printer for selective melting of thermoplastic powders.

Direct powder methods/powder bed systems are known in the form of laser melting processes, for example selective laser melting (SLM), laserCUSING and direct metal laser sintering (DMLS). The single exception from this process principle is the electron beam melting process (EBM), in which an electron beam is used under high vacuum.

Another system that uses a powder bed is the Höganäs digital metal process. This system uses a precision inkjet to deposit a specific "ink" on a layer of thickness 45 μm made of metal powder. A further 45-micrometer powder layer is applied, and the printing step is repeated until the component has been completed. The component is then released and sintered to obtain the final size and strength. One of the advantages of this system is that construction is achieved at room temperature without the partial melting that occurs when laser technology or electron beam technology is used. In principle, there is also no need for any supportive structures during the construction procedure, because these are supported by the powder bed.

Although systems with powder supply use the same starting material, there is a considerable difference in the manner of layer-by-layer addition of the material. The powder flows through a nozzle, whereupon it is melted by a beam directly on the surface of the treated component.

Systems with powder supply are also termed laser cladding, directed energy deposition and laser metal deposition. The process is very precise, and is based on automated deposition of a layer of material with a thickness between 0.1 mm and a number of centimeters. Some of the features of this process are the metallurgical bonding of the coating material to the base material and the absence of undercuts. The process differs from other welding techniques in the small extent to which the heat introduced penetrates into the film. Highly heat-sensitive films can therefore also be processed.

A development of this technology is the laser engineered net shaping (LENS) powder supply system. This method permits addition of material to an existing component on the film.

It is also possible to use ADAM (atomic diffusion additive manufacturing) with various metal powders. For this, the powder is shaped layer-by-layer in plastics binder. After the printing procedure, the functionalization is sintered together with the film in an oven which burns the binder off and consolidates the powder to give a final, fully consolidated metal component.

In summary, additive processes that can be used for the purpose of this process step comprise by way of example those described above. Suitable examples are therefore high-speed sintering, selective laser melting, selective laser sintering, selective heat sintering, binder jetting, electron beam melting, fused deposition modeling, fused filament fabrication, cladding, friction stir welding, wax deposition modeling, contour crafting, metal-powder application processes, cold gas spraying, electron beam melting, stereolithography, 3D screen printing processes, light-controlled electrophoretic deposition, printing of highly metal-powder-filled thermoplastics by the FDM process, nanoscale metal powder in the inkjet process, DLP (direct light processing), inkjetting, and continuous light interface processing (CLIP). These processes can be used for the application of the functionalization composition in step c).

It is also possible to use areal processes for the application of the functionalization composition. In these, just as in the stereolithography process, a photopolymer solution is photoirradiated. Here, however, the photoirradiation is not spot-photoirradiation by way of a laser beam, but instead is areal photoirradiation. For this, a photoirradiation matrix is projected onto the respective layer in order to harden the material at these sites.

In the case of the DLP process (digital light processing), a dot pattern is projected from above onto the photopolymer area, and the construction platform drops layer-by-layer into the solution. This process has the advantage that it is also possible to use different intensities of photoirradiation to vary the hardening. It is thus possible by way of example to achieve easier removal of supportive structures, if these have been hardened to a lesser extent.

In the 3D printing method termed LCM (lithography-based ceramic manufacturing), the photopolymer bath is photoirradiated from below, rather than from above. This process is specifically used for photoirradiation of a mixture made of solid constituents (ceramic) and a photopolymer solution. The resultant green body is sintered after the 3D printing procedure, and the binder is burnt out. This 3D printing process has the advantage of the possibility to use a variety of granulates.

With CLIP (continuous liquid interface production) technology it is possible to produce objects without visible layers. The photopolymerization of the liquid resin is controlled by means of balancing of UV light (hardening) and oxygen (which prevents hardening). The base of the resin tank consists of a light- and air-permeable material, similar to that of contact lenses. It is thus possible in the undermost layer, by means of oxygen, to produce what is known as a "dead zone", which permits the further construction of the object that is drawn continuously upward out of the tank.

In the case of stereolithography (SLA process), a plastic that hardens on exposure to light and is also termed photopolymer is hardened in thin layers by a laser. The process takes place in a melt bath comprising the monomers on which the light-sensitive (photosensitive) plastic is based. After each step, the workpiece is lowered a few millimeters into the bath and retracted to a position that is below the previous position by the amount corresponding to one layer thickness.

The 3D printing process utilized in this step for the production of a functionalization by means of additive manufacturing comprises firstly a step in which the functionalization is produced by repeated spatially selective arrangement, layer-by-layer and in accordance with a cross section of the functionalization, in particular application and/or melting and/or polymerization and/or adhesive bonding, of at least one functionalization composition on the film.

In particular, a process that operates by means of inkjet technology can be used as additive process. An example that can be mentioned here is binder jetting.

Any material that can be processed by means of an additive process can moreover in principle be used as functionalization composition. The material used can therefore by way of example be any material that can be melted under suitable conditions and that resolidifies. It is moreover possible to use only one functionalization composition or to use a mixture of materials, or to use a plurality of functionalization compositions. If a plurality of functionalization compositions are used, these can be arranged in different layers or else in the same layers.

In principle, the functionalization composition can be present in powder form on the film, or else can already be in molten form when it is applied to the film.

The expression "coherent or interlocking connection" between the workpiece surface and the surface of the film functionalized in step c) means, according to the invention, a connection between the two surfaces which is such that the two surfaces preferably cannot be separated from one another without use of considerable forces. Specifically, the expression "coherent connection" means either a coherent chemical connection or a coherent physical connection. The expression "interlocking connection" means a connection between the surfaces with dovetailing of the surfaces. It is preferable that the dovetailing is achieved by subjecting the surfaces to a forming procedure. The strength of a bond between the two surfaces is preferably ≥0.1 N/mm, preferably ≥0.3 N/mm, preferably ≥0.5 N/mm, measured in accordance with DIN ISO 55529:2012-09.

In an advantageous embodiment of the process of the invention, at least a portion of the functionalized composition comprises a fusible polymer. It is preferable that the entire functionalization composition comprises a fusible polymer. It is moreover preferable that the fusible polymer is in particulate form, where at least 90% by weight of the particles have a particle diameter that is ≤0.25 mm, preferably ≤0.2 mm, particularly preferably ≤0.15 mm. The particles comprising the fusible polymer can by way of example have homogeneous structures such that no further fusible polymers are present in the particles.

Suitable functionalization compositions can be produced by way of various familiar processes, for example grinding processes, cryogrinding, precipitation processes, spray-drying processes, and others.

The functionalization composition preferably also comprises, alongside the fusible polymer, other additives such as fillers, stabilizers and the like, and also other polymers. The total content of additives in the particles can by way of example be ≥0.1% by weight to ≤60% by weight, preferably ≥1% by weight to ≤40% by weight.

In a preferred embodiment, the functionalization composition comprises a fusible polymer selected from: polyetheretherketone (PEEK), polyaryletherketone (PAEK), polyetherketoneketone (PEKK), polyethersulfones, polyimide, polyetherimide, polyesters, polyamides, polycarbonates, polyurethanes, polyvinyl chloride, polyoxymethylene, polyvinyl acetate, polyacrylates, polymethacrylates, TPE (thermoplastic elastomers), thermoplastics such as polyethylene, polypropylene, polylactide, ABS (acrylonitrile-butadiene-styrene copolymers), PETG (a glycol-modified polyethylene terephthalate), or else polystyrene, polyethylene, polypropylene, and blends and/or alloys of at least two of the polymers mentioned.

The functionalization composition preferably comprises a polyurethane obtainable at least partly from the reaction of aromatic and/or aliphatic polyisocyanates with suitable (poly)alcohols and/or (poly)amines or blends thereof. At least a proportion of the (poly)alcohols used preferably comprises those from the group consisting of: linear polyester polyols, polyether polyols, polycarbonate polyols, polyacrylate polyols, and a combination of at least two of these. In a preferred embodiment, these (poly)alcohols or (poly)amines bear terminal alcohol and/or amine functionalities. In another preferred embodiment, the molar mass of the (poly)alcohols and/or (poly)amines is 52 to 10 000 g/mol. It is preferable that these (poly)alcohols or (poly)amines as starting materials have a melting point in the range from 5 to 150° C. Preferred polyisocyanates, at least a proportion of which can be used for the production of the fusable polyurethanes, are TDI, MDI, HDI, PDI, H12MDI, IPDI, TODI, XDI, NDI and decane diisocyanate. Particularly preferred polyisocyanates are HDI, PDI, H12MDI, MDI and TDI.

It is likewise preferable that the functionalization composition comprises a polycarbonate based on bisphenol A and/or on bisphenol TMC.

Alternatively it is possible that the functionalization composition is a metal. In this embodiment, the application sectors of the functionalized workpieces can be in medical technology, in the air travel sector, in the automotive sector or in the jewelry production sector. Suitable metals for the functionalization composition comprise, for example, tool steels, maraging steels or martensite-hardening steels, stainless steel, aluminum or aluminum alloys, cobalt-chromium alloys, nickel-based alloys, for instance superalloys, titanium and titanium alloys, for example in commercial purity, copper and copper alloys, or precious metals, for instance gold, platinum, palladium, silver. The functionalization is constructed layer-by-layer in the process of the invention. If the number of repetitions for application and irradiation is sufficiently small, the article that is to be constructed can also be described as two-dimensional. This type of two-dimensional article can also be characterized as a coating. By way of example, the number of repetitions carried out for application and irradiation for construction thereof can be ≥2 to ≤20.

A process for the production of a functionalization on a film preferably comprises by way of example the steps of:

I) deposition, on the film, of a resin that crosslinks by a free-radical route, thus obtaining a layer of a build material connected to the film;

II) deposition, onto a previously applied layer of the build material, of a resin that crosslinks by a free-radical route, thus obtaining a further build material layer connected to the previously applied layer;

III) repetition of step II) until the functionalization has been formed;

where the deposition, at least in step II), of a resin that crosslinks by a free-radical route is achieved by photoirradiation and/or other irradiation of a selected region of a resin that can be crosslinked by a free-radical route, in accordance with the respectively selected cross section of the functionalization.

In this embodiment it is moreover optionally possible after step III) to carry out a further step IV):

IV) treatment of the functionalization obtained after step III) under conditions sufficient to obtain, by exposure to further high-energy radiation and/or by thermally induced post-curing, postcrosslinking in the resin crosslinked by a free-radical route.

In this embodiment, therefore, the functionalization is obtained in two production phases. The first production phase can be regarded as the construction phase. This construction phase can be realized by means of photoradiative additive manufacturing processes such as the inkjet process, stereolithography or the DLP (digital light processing) process, and is provided by the steps I), II) and III). The second production phase can be regarded as curing phase and is provided by the step IV). Here, the functionalization obtained after the construction phase is converted to a more mechanically durable article without further alteration of its shape.

In step I) of the embodiment, a resin crosslinked by a free-radical route is deposited on the film. This is usually the first step in inkjet, stereolithography and DLP processes. A layer of a build material connected to the film is thus obtained and corresponds to a first selected cross section of the precursor.

In step III), step II) is repeated until the desired functionalization has been formed. Step III) preferably comprises a number of repetitions in a range from 2 to 10 000, preferably in a range from 3 to 1000, preferably in a range from 5 to 500, particularly preferably in a range from 10 to 100. In step II) a resin crosslinked by a free-radical route is deposited onto a previously applied layer of the functionalization composition, thus giving a further layer of the functionalization composition which corresponds to another selected cross section of the functionalization and which has been connected to the previously applied layer. The previously applied layer of the functionalization composition can be the first layer from step I) or can be a layer from a previous pass of step II).

The invention provides that the deposition of a resin crosslinked by a free-radical route at least in step II) (preferably also in step I) is achieved by photoirradiation and/or other irradiation of a selected region of a resin that can be crosslinked by a free-radical route, in accordance with the respectively selected cross section of the functionalization. This can be achieved either by selective photoirradiation (stereolithography, DLP) of the resin or else by selective application of the resin, followed by a photoirradiation step which, by virtue of the previous selective application of the resin, need not then be selective (inkjet process).

The expressions "resin that can be crosslinked by a free-radical route" and "resin crosslinked by a free-radical route" are utilized in the context of the present invention. The resin that can be crosslinked by a free-radical route is converted here to the resin crosslinked by a free-radical route by the photoirradiation and/or other irradiation, which initiates free-radical crosslinking reactions. The word "photoirradiation" here means exposure to light in the range between near IR light and near UV light (1400 nm to 315 nm wavelength). The other shorter wavelength ranges are covered by the terms "irradiation" or "other irradiation", examples being far UV light, X-ray radiation, gamma radiation and also electron beams.

The selection of the respective cross section is advantageously achieved via a CAD program which has been used to produce a model of the functionalization to be produced. This operation is also termed "slicing", and serves as basis for the control of the photoirradiation and/or other irradiation of the resin that can be crosslinked by a free-radical route.

The viscosity of the resin that can be crosslinked by a free-radical route is preferably (23° C., DIN EN ISO 2884-1)≥5 mPas to ≤100 000 mPas. It should therefore be regarded as liquid resin at least for the purposes of additive manufacturing. The viscosity is preferably ≥50 mPas to ≤10 000 mPas, more preferably ≥500 mPas to ≤1000 mPas.

The resin that can be crosslinked by a free-radical route can also comprise, alongside the curable components, a non-curable component which comprises a mixture of, for example, stabilizers, fillers and the like.

The treatment in step IV) may in the simplest case be storage at room temperature (20° C.). Storage at a temperature above room temperature is preferably also possible.

It is preferable that step IV) is delayed until the entire functionalization has reached its gel point. The gel point is regarded as having been reached when, in dynamic-mechanical analysis (DMA) using a plate/plate oscillation viscometer in accordance with ISO 6721-10 at 20° C., the graphs of the storage modulus G' and of the loss modulus G" intersect. The precursor is optionally subjected to further photoirradiation and/or other irradiation to bring free-radical crosslinking to completion. The storage modulus G' of the resin crosslinked by a free-radical route (DMA, plate/plate oscillation viscometer in accordance with ISO 6721-10 at 20° C. and a shear rate of 1/s) can be ≥$10^6$ Pa.

The resin that can be crosslinked by a free-radical route can moreover comprise additives such as fillers, UV stabilizers, free-radical inhibitors, antioxidants, mold-release agents, water scavengers, slip additives, defoamers, leveling agents, rheology additives, flame retardants and/or pigments. The quantities present of these auxiliaries and additives, with the exception of fillers and flame retardants, are usually less than 10% by weight, preferably less than 5% by weight, more preferably up to 3% by weight, based on the resin that can be crosslinked by a free-radical route. Quantities present of flame retardants are usually at most 70% by weight, preferably not more than 50% by weight, more preferably not more than 30% by weight, calculated as the total quantity of flame retardants used based on the total weight of the resin that can be crosslinked by a free-radical route.

Examples of suitable fillers are $AlOH_3$, $CaCO_3$, metal pigments such as $TiO_2$ and other known customary fillers. Quantities present of these fillers are preferably at most 70% by weight, preferably not more than 50% by weight, particularly preferably not more than 30% by weight, calculated as the total amount of fillers used, based on the total weight of the resin that can be crosslinked by a free-radical route.

Suitable UV stabilizers can preferably be selected from the group consisting of piperidine derivatives such as 4-benzoyloxy-2,2,6,6-tetramethylpiperidine, 4-benzoyloxy-1,2,2,6,6-pentamethylpiperidine, bis(2,2,6,6-tetramethyl-4-piperidyl) sebacate, bis(1,2,2,6,6-pentamethyl-1-4-piperidinyl) sebacate, bis(2,2,6,6-tetramethyl-4-piperidyl) suberate, bis(2,2,6,6-tetramethyl-4-piperidyl) dodecanedioate; benzophenone derivatives such as 2,4-dihydroxybenzophenone, 2-hydroxy-4-methoxybenzophenone, 2-hydroxy-4-octoxybenzophenone, 2-hydroxy-4-dodecyloxybenzophenone or 2,2'-dihydroxy-4-dodecyloxybenzophenone; benzotriazole derivatives such as 2-(2H-benzotriazol-2-yl)-4,6-di-tert-pentylphenol, 2-(2H-benzotriazol-2-yl)-6-dodecyl-4-methylphenol, 2-(2H-benzotriazol-2-yl)-4,6-bis(1-methyl-1-phenylethyl)phenol, 2-(5-chloro-2H-benzotriazol-2-yl)-6-(1,1-dimethylethyl)-4-methylphenol, 2-(2H-benzotriazol-2-yl)-4-(1,1,3,3-tetramethylbutyl)phenol, 2-(2H-benzotriazol-2-yl)-6-(1-methyl-1-phenylethyl)-4-(1,1,3,3-tetramethylbutyl) phenol, isooctyl 3-(3-(2H-benzotriazol-2-yl)-5-(1,1-dimethylethyl)-4-hydroxyphenylpropionate), 2-(2H-benzotriazol-2-yl)-4,6-bis(1,1-dimethylethyl)phenol, 2-(2H-benzotriazol-2-yl)-4,6-bis(1-methyl-1-phenylethyl)phenol, 2-(5-chloro-2H-benzotriazol-2-yl)-4,6-bis(1,1-dimethylethyl)phenol; oxalanilides such as 2-ethyl-2'-ethoxyoxalanilide or 4-methyl-4'-methoxyoxalanilide; salicylic esters such as phenyl salicylate, 4-tert-butylphenyl salicylate, 4-tert-octylphenyl salicylate; cinnamic ester derivatives such as methyl α-cyano-β-methyl-4-methoxycinnamate, butyl α-cyano-β-methyl-4-methoxycinnamate, ethyl α-cyano-β-phenylcinnamate, isooctyl α-cyano-β-phenylcinnamate; and malonic ester derivatives, such as dimethyl 4-methoxybenzylidenemalonate, diethyl 4-methoxybenzylidenemalonate, dimethyl 4-butoxybenzylidenemalonate. These preferred light stabilizers can be used either individually or in any desired combinations with one another.

Particularly preferred UV stabilizers are those that completely absorb radiation of a wavelength <400 nm. Among these are by way of example the benzotriazole derivatives mentioned. Very particularly preferred UV stabilizers are 2-(5-chloro-2H-benzotriazol-2-yl)-6-(1,1-dimethylethyl)-4-methylphenol, 2-(2H-benzotriazol-2-yl)-4-(1,1,3,3-tetramethylbutyl)phenol and/or 2-(5-chloro-2H-benzotriazol-2-yl)-4,6-bis(1,1-dimethylethyl)phenol.

One or more of the UV stabilizers mentioned as examples are optionally added to the resin that can be crosslinked by a free-radical route, preferably in quantities of 0.001 to 3.0% by weight, more preferably 0.005 to 2% by weight, calculated as the total quantity of UV stabilizers used, based on the total weight of the resin that can be crosslinked by a free-radical route.

Suitable antioxidants are preferably sterically hindered phenols, which may preferably be selected from the group consisting of 2,6-di-tert-butyl-4-methylphenol (ionol), pentaerythritol tetrakis(3-(3,5-di-tert-butyl-4-hydroxyphenyl) propionate), octadecyl 3-(3,5-di-tert-butyl-4-hydroxyphenyl)propionate, triethylene glycol bis(3-tert-butyl-4-hydroxy-5-methylphenyl)propionate, 2,2'-thiobis(4-methyl-6-tert-butylphenol), and 2,2'-thiodiethyl bis[3-(3,5-di-tert-butyl-4-hydroxyphenyl)propionate]. These may be used as required either individually or in any desired combinations with one another. Quantities used of these antioxidants are preferably 0.01 to 3.0% by weight, more preferably 0.02 to 2.0% by weight, calculated as the total quantity of antioxidants used, based on the total weight of the resin that can be crosslinked by a free-radical route.

Suitable free-radical inhibitors/retarders are in particular those that provide targeted inhibition of uncontrolled free-radical polymerization of the resin formulation outside the desired (irradiated) region. These are of decisive importance for good contour sharpness and replication accuracy in the precursor. Suitable free-radical inhibitors must be selected in accordance with the desired free-radical yield from the irradiation/photoirradiation step and the polymerization rate and reactivity/selectivity of the double-bond-bearing compounds. Examples of suitable free-radical inhibitors are 2,2-(2,5-thiophenediyl)bis(5-tert-butylbenzoxazole), phenothiazine, hydroquinones, hydroquinone ethers, quinone alkyds and nitroxyl compounds and mixtures thereof, benzoquinones, copper salts, pyrocatechols, cresols, nitrobenzene, and oxygen. Quantities preferably used of these antioxidants are 0.001% by weight to 3% by weight.

In step d), the film is preferably brought into contact with at least one portion of the workpiece surface for development of a coherent or interlocking connection between the workpiece surface and the film functionalized in step c), preferably via pressing of the film with the at least one portion of the workpiece surface, where a functionalized film side is used to achieve the coherent or interlocking connection to the workpiece surface. When the film contacts, or is pressed on to, at least one portion of the workpiece surface, it is preferable that the film is subjected to a forming procedure at least to some extent. After this step, according to the invention the functionalization is therefore arranged between the workpiece surface and the film, and the functionalization is therefore substantially protected from environmental effects. In particular, the functionalization according to the invention is not on the upper side of the film facing toward the environment or facing toward a user. The latter embodiment applies only to cases in which the film has only one functionalization. If both film sides have a functionalization, it is then possible according to the invention that one of the functionalizations is between film and workpiece surface and that the other functionalization is on the film facing toward the user.

The contact of the film with a portion of the workpiece surface is preferably implemented by means of customary methods merely with exertion of mechanical forces or by a combination of mechanical forces with a thermal and/or chemical treatment; this can also be termed pressing. On contact of the film with at least one portion of the workpiece surface or pressing of the film onto at least one portion of the workpiece surface it is preferable that the film is subjected to a forming procedure at least to some extent. In the simplest cases, establishment of intimate contact between functionalized film and workpiece surface is sufficient to achieve adequate strength of bond between the two. The strength of the bond between the two can additionally be controlled in that the workpiece surface or the functionalized film is/are heated to the defined temperature, thus permitting either a more intimate mechanical contact between the two or else better intermolecular interaction between the polymer molecules of the functionalized film and the workpiece surface. The strength of the bond between two elements can by way of example also be advantageously influenced via further mechanical holding elements, for example clamps, holders or the like. The strength of the bond between two elements can moreover be further improved by applying adhesive to at least one of the two sides: reverse side of the functionalized film and/or workpiece. The adhesive can likewise be applied by way of a 3D printing process.

In a preferred embodiment of the process, the heat distortion temperature (HDT) measured in accordance with DIN EN ISO 75-1 to 3 method B of the printed functionalization composition is $\geq 5°$ C. and $\leq 200°$ C. higher than the heat distortion temperature of the film. In a method found to be particularly suitable for maximizing the strength of the bond between functionalization composition and film underside, compliance is maintained with a defined relationship between the heat distortion temperatures of the two polymer compositions. Firstly, within the temperature range stated above it is possible to achieve good strength of the bond between functionalization composition and film for many material pairings. Secondly, the mechanical stability of the film is not endangered by the process of application of the functionalization composition. Furthermore, by virtue of the range stated above, homogeneous application of functionalized and non-functionalized film regions to the workpiece surface is obtained. This latter is in particular applicable in shaping processes which comprise thermal process steps. The heat distortion temperature of the printed functionalization composition can particularly preferably be $\geq 10°$ C. and $\leq 70°$ C., more preferably $\geq 20°$ C. and $\leq 50°$ C., higher than the heat distortion temperature of the film.

In a preferred embodiment of the process, for the functionalization in step c), the film has been arranged to be flat. A flat arrangement of the film has been found to be particularly suitable for obtaining maximal uniformity of the functionalization and for maximizing production speeds. Surprisingly, functional workpieces also be obtained even if the geometry of the workpiece surface deviates significantly from a flat geometry. It is likely that in many cases the process of the invention can compensate the distortions and curvatures that may be present in the workpiece surface, and therefore there is no essential requirement to adapt the film geometry to the workpiece geometry, even though the functionalization takes place in the flat state. The reason for this is very probably the protection provided to, and the mechanically flexible embedment of, the functionalization. Said functionalization is likely to compensate a portion of the forces that may arise during the process of application onto significantly deviating workpiece surface geometries.

In a preferred embodiment of the process, before the functionalization in step c), the film is secured tautly across a mold, where the surface of the mold is a mirror image of the workpiece surface. In a method that has been found to be suitable for achieving conformation of the functionalization to complex workpiece surfaces with a geometry deviating significantly from flat, the 3D printing is carried out on a film side that has been adapted and that, at least in partial regions, is not flat. The functionalization is therefore achieved on a film side that is a mirror image of the workpiece surface. The application of the functionalized film is achieved with the functionalization composition facing toward the workpiece surface, and therefore a symmetry is obtained that is appropriate for the functionalization. It is thus possible to achieve reliable functionalization of sites on the workpiece surface that are difficult to functionalize, for example discontinuities and ridges. Even the subsequent attachment of the film to the workpiece surface does not then lead to any excessive mechanical loading of the functionalization composition.

In another aspect of the process, the layer thickness of the deposited functionalization composition is preferably greater than the layer thickness of the film. By virtue of the mechanical protection provided to the functionalization composition between the film and the workpiece surface it is also possible to print functionalization compositions with increased height without creating the risk of any severe mechanical damage to the functionalization. The abovementioned risk is in particular present in the prior art, which attaches the functionalization on the upper side of the film. A functionalization with increased thickness can lead to significantly better overall mechanical, optical and functionalization properties. It is therefore possible by way of example to transport more electrical power through structures which are significantly thicker and have been printed with increased height. When structures of increased height are compared with flatter structures, furthermore, the former exhibit significantly better haptic perceptibility through the film. This helps to make the product more user-friendly.

In a preferred characteristic of the process, the film is controlled by a thermal process step during or before the functionalization in step c) to a temperature T which, in relation to the glass transition temperature of the film ($T_g$), is in a range of $\geq -50°$ C. and $\leq +150°$ C., the temperature T therefore being in a range of 50° C. below $T_g$ to 200° C. above $T_g$. In a method that has proven particularly simple for the mechanical bonding of the functionalization composition, before the printing to apply the functionalization composition, the temperature of the film is controlled to the temperature range stated above because, in combination with the additive manufacturing process, it is thus possible by way of the application of either swellable resins or heated thermoplastics to achieve intimate connection of the functionalization to the film. This thermal conditioning can provide secure bonding of functionalization compositions on many film compositions. This can by way of example also be achieved without further measures intended to improve the bonding, for example via application of further substances that improve bonding. In relation to the glass transition temperature, the temperature T can particularly preferably be ≥−20° C. and ≤+150° C., more preferably ≥−5 and ≤+100° C. In relation to the $T_g$ of the substance that improves bonding, the temperature T is preferably ≥+10° C. and ≤+150° C.

It is preferable that the 3D printing process in step c) is selected from FFF processes, inkjetting processes or SLS processes. By means of these processes it is possible to deposit particularly precise and flexible structures which exhibit particularly effective bonding on the workpiece surface. Even in difficult geometries, these processes achieve bonding of the functionalization compositions, and it is also possible to achieve particularly thin design of the functionalization.

In a preferred embodiment of the process, the polymeric material of the functionalization composition is selected from the group consisting of polyurethane, polycarbonate, polyesters, polyamide, polyetherimide, polyetherketone, polyimide, polyoxymethylene, polysilicone, thermoplastic elastomers, polyurethane, polyacrylate-containing thermoset materials, and mixtures of at least two thereof. These materials have also proven to be particularly suitable for the functionalization of particularly challenging workpiece surface geometries. At the same time, the functionalization compositions deposited with these materials prove to have particular flexibility and mechanical strength, and it is therefore possible to obtain functionalizations with a long lifetime. It is particularly preferably possible here to use thermoset materials with a Tg<20° C. In a further embodiment, it is preferably also possible to use thermoset materials with a Tg>50° C.

In a preferred embodiment of the process, in step d) the coherent or interlocking connection between workpiece surface and functionalized film is achieved by way of a thermoforming step. In particular, the coupling between mechanical and thermal forces can contribute to particularly good bonding between the functionalized film side and the workpiece surface. Without restriction to the theory, it is possible that the elevated temperature contributes to an increased flexibility of functionalized film, thus facilitating the forming-procedure step and contributing, by way of the shrinkage that occurs after cooling, to better bonding of the two components to one another. In relation to the softening point of the film (measured as melting point or, respectively, as glass transition temperature in the absence of a melting point by means of DSC at a heating rate of 10° C./minute), the temperature in the thermoforming step can be in a range particularly preferably from ≥−50° C. to ≤100° C., more preferably ≥−10° C. to ≤50° C.

Thermoforming is a process for the shaping of thermoplastics with exposure to heat, and also with the aid of compressed air or vacuum. Another term sometimes used for the process is "vacuum thermoforming".

Thermoforming processes are classified in accordance with the respective semifinished product used: Relatively thin semifinished products are called films; relatively thick semifinished products (starting at about 1.5-2 mm) are called sheets. Semifinished film products can be on large rolls (up to Ø 1.8 m) when they are introduced into thermoforming machines. In a typical procedure of this type, film from large rolls is guided at the film-web edges in what are known as spike-chain systems. The film, not yet softened or heated, is thus first introduced into the shaping machine, and is then passed discontinuously through same. Radiant heat sources in a heating unit are controlled by way of industrial heating-control systems, and the film is thus heated on one or both sides. The film, which has been heated and is now relatively soft, is readily subjected to tension in the spiked guide systems here; excessive sag of the film is thus prevented. In the mold unit, the film is secured by means of a clamping frame; the plug and the thermoforming mold pass through the plane of the film, and provide an early approximation of the finished shape. In order to establish rapid and firm contact between the film and the water-cooled wall (shape) of the aluminum shaping mold, compressed air is then applied from one side and vacuum is applied from the other side. The air between film and aluminum mold escapes through small holes and/or wide slits. The film, which has cooled and is now solid, is separated from the shaping mold and in the next operating cycle is optionally introduced into the punching unit. Punching in the unit provides the external dimensions, or else provides holes in the finished workpiece.

Use of slide systems, foldable cores and rotatable cores also permit realization of complex designs. Punching in more than just one plane is also possible. Both monofilms and multilayer films can be processed by this process. In principle, all thermoplastics can be processed in this process. By way of example, talc-reinforced PE can be used to produce wheel surrounds with large dimensions. ABS with acrylic outer layer can be used for claddings which are exposed to the effects of severe weathering or which have contact with chemicals. Carbon black particles can be added in order to bring about a certain degree of electrical conductivity of small load carriers. The forming procedure can also be applied to engineering plastics such as PEEK.

Thermoforming has applications not only in the traditional application sector of packaging but also in the industrial sector. As alternative to injection molding, it features advantageous mold costs, and is particularly cost-effective, particularly for small and medium-sized production runs. Examples of thermoformed components are hoods and claddings of all types for mechanical engineering and chemical engineering, for agricultural machinery and construction machinery, and for industrial trucks and construction of commercial vehicles. An application that may be mentioned inter alia in the consumer goods sector is found in the production of refrigerators and freezers. In that application, thermoforming is used to produce the internal containers and the internal cladding of the doors. This process is also used for the production of accessories in the motor vehicle sector, e.g. in the production of luggage compartment troughs.

Components providing acoustic and thermal insulation, e.g. for the automobile industry, are produced from materials such as polyurethane foam or glass fiber mats. Other applications of thermoformed films are found in the dental technology sector and in a very wide variety of medical and orthopedic applications.

In another, preferred embodiment of the process, before or during the thermoforming step the functionalized film is heated to a temperature that is ≥5° C. above its heat distortion temperature (HDT). The temperature range stated above has proven to be particularly suitable for maximizing precision of fit in the connection between film and workpiece surface. Said range can provide adequate flexibility for the film and of the functionalization composition, but at the same time prevents excessive thermal stressing of the structures obtained by 3D printing. In other embodiments the film can be heated, before the thermoforming step, to a temperature ≥10° C., more preferably ≥25° C., moreover ≥50° C., above the heat distortion temperature (HDT) measured in accordance with DIN EN ISO 75-1 to 3 method B. It is moreover preferable that, in this step under the conditions mentioned, the functionalization composition and the film exhibit a difference of ≥5° C. and ≤200° C. in the heat distortion temperature (HDT) measured in accordance with DIN EN ISO 75-1 to 3 method B.

In an embodiment of the process it is preferable that, before the step d), a tie layer is provided at least to some extent either to the functionalized film side or to the workpiece surface. It is advantageously possible to apply to the film with the printed-on functionalization composition, a tie layer as adhesion-promoter layer made of the same plastics material as the functionalization composition. The functionalization composition applied during the three-dimensional printing can bring about incipient melting of the adhesion-promoter layer and connect securely thereto. The adhesion-promoter layer here therefore provides properties that are the same as those provided by a functionalization layer previously printed with the functionalization composition, and therefore the subsequently printed functionalization layer can fuse with the adhesion-promoter layer to form a unit in precisely the same way as with a previously printed functionalization layer. It is not essential here to use the same plastic for the adhesion-promoter layer and for the functionalization. It is essential that the plastics can successfully connect to one another. It is therefore also possible to use plastics made of related substance classes, or plastics with similar polarities. Alternatively, it is also possible to apply a layer made of heat-activatable adhesive to the printed functionalization. Plastics suitable in this context are in general terms all thermoplastic materials. Materials that can be used for plastics compositions made of acrylonitrile-butadiene-styrene copolymer (ABS) or polycarbonate (PC) or ABS-PC are by way of example adhesives based on polyvinyl chloride (PVC), polyurethane or polyvinyl acetate, or based on acrylates, or are adhesives based on mixtures of PVC with acrylates. The layer thickness of the adhesion-promoter layer is advantageously 0.005 mm to 0.2 mm, preferably 0.01 mm to 0.1 mm. It is thus possible to achieve particularly good compensation of the unevennesses resulting from the three-dimensional printing, and to produce good bonding to the workpiece surface. The adhesive can preferably be applied before the forming-procedure step to the film, to the workpiece surface or to both surfaces.

In another preferred embodiment, the adhesive is a thermally activatable adhesive. These adhesives can be used in highly individualized manner, and the bond strength and the bond location can be controlled very precisely by varying the selected temperature profile.

In a preferred characteristic of the process, the functionalization composition also comprises alongside the polymeric material, functionalized additions selected from the group consisting of conductive materials, dyes, pigments, fillers, fibers, and mixtures thereof. The process of the invention is sufficiently flexible to permit integration of a wide variety of functional properties into the film and into the workpiece surface, by way of the 3D printing step. For this reason, it is also possible to incorporate, into the functionalization composition, further substances which can by way of example influence the mechanical properties of the functionalization composition and therefore also of the film and of the workpiece surface. However, the additions can also simply be colorant additions which allow the user to find the functionalized surface sites more easily.

In a preferred embodiment of the process, the functionalization of the film in step c) comprises the application of fixing means to the film by printing. In a method which has moreover been found to be particularly suitable, at least fixing means are applied by printing, by using 3D printing for the functionalization of the film. These fixing means can preferably engage into complementary retention means on the workpiece surface and thus contribute to improved strength of the bond between the film and the workpiece surface. It is also possible to realize difficult workpiece surface geometries, and even to realize different stress values in different film segments. The process is versatile by virtue of the possibility of different positioning of the fixing means. By way of example, it is possible to conceive of fixing means which, as a result of variation in the film materials used or as a result of variation of thickness of the functionalization composition, have different height and which, as required, can engage into retention means on the workpiece surface. The term "retention means" can by way of example mean pins, hooks, eyes or guide elements which are positioned opposite to complementary retention means or opposite retention means on the workpiece surface.

In a preferred embodiment of the process, the 3D printing uses liquid reactive substances, where the substances comprise a swelling agent or solvent for the film, and where the increase in weight per unit area exhibited by the film in contact with the swelling agents or solvents for >8 h is >2%, preferably >5%. Particularly good bond strength values are achieved via the spot-swelling of the film by the reactive 3D printing material. Alternatively, the reactive material can also react with the film with development of Van der Waals bonds, hydrogen bond interactions or ionic interactions, or with linkage of chemical compounds.

The invention moreover provides a workpiece with a functionalized surface, where the workpiece has been produced by the process of the invention. By means of the process of the invention it is possible to produce, in flexible and inexpensive manner, individualized or individually functionalized workpieces which feature particularly efficient strength of bond between the functionalization, in the form of a film functionalized by 3D printing, and the actual workpiece surface. It is moreover possible, by way of the separation of the individual production steps, to simplify the logistics for the production of the individual workpieces; this can lead to a cost saving. For the other advantages of the workpieces functionalized in an individualized manner, reference is made explicitly to the advantages specified for the process of the invention.

In a preferred embodiment, the workpiece can be an interior component of a vehicle selected from the group consisting of aircraft, rail vehicles and motor vehicles. The process of the invention and the workpiece surfaces functionalized according to the invention are suitable in particular for surfaces which have to meet stringent requirements, for example those occurring in the application sectors stated above. In such cases, the advantages of the process and of the workpieces can result in functionalizations which are durable and can be applied in a reliable manner and which moreover can be produced in a manner that is individualized and flexible.

In a preferred embodiment of the workpiece, a strength of the bond between film and functionalization composition can be measured in accordance with DIN ISO 55529:2012-09, where a test area in accordance with the test is printed onto the film, as also is a projecting tab which can be peeled in a T-peel test. It is preferable according to the invention that bond strength values obtained here are >0.1 N/mm, preferably >0.3 N/mm, preferably >0.5 N/mm. This range of bond strength can provide sufficient flexibility in the forming-procedure step and adequate long-term bond strength, so that the functionality of the surface is retained for a sufficiently long period.

Figure 1:
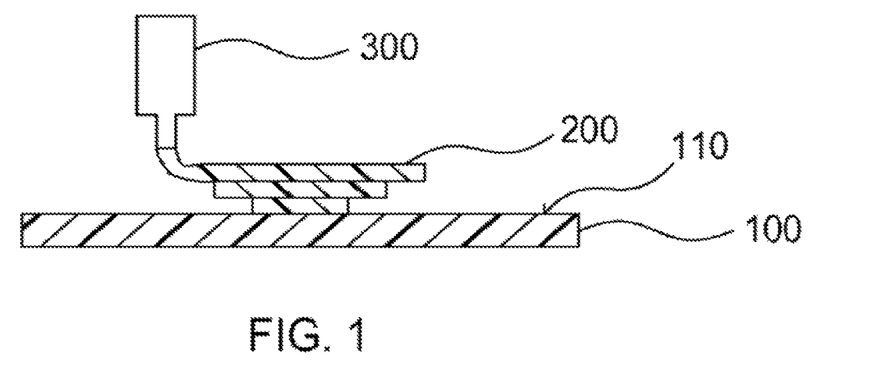
FIG. 1 shows a film with a designated film side having a plurality of layers of a functionalization composition applied layer-by-layer to the film side by means of an FDM printing head in an additive manufacturing process.
Figure 2:
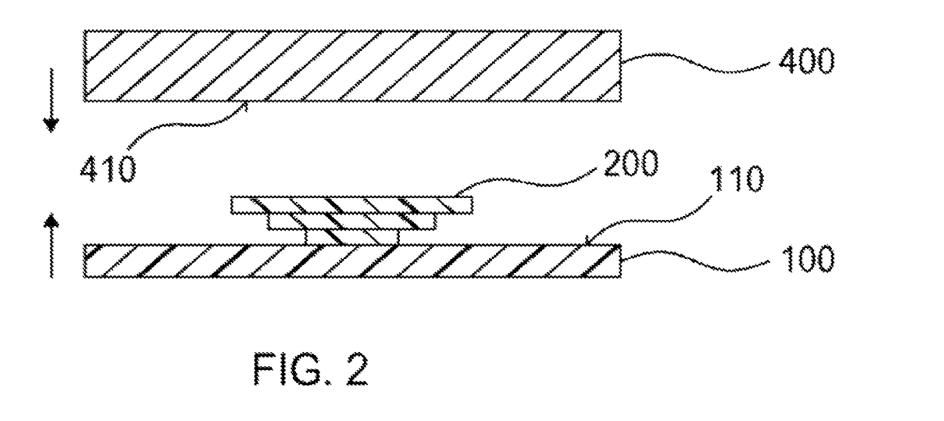
FIG. 2 shows a situation after conclusion of the FDM printing where the side of the film that has been functionalized is brought into connection with a workpiece which has a designated workpiece surface.
Figure 3:
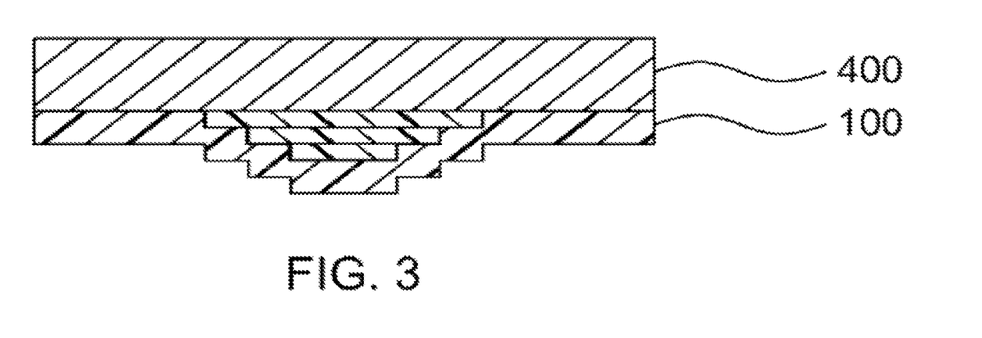
FIG. 3 shows a situation after functionalized film and workpiece have been joined together.

The invention is explained in more detail with reference to the figures below, but is not restricted thereto. FIGS. 1 to 3 show diagrams of steps in the process of the invention.

FIG. 1 shows a film 100 with a designated film side 110. A plurality of layers of a functionalization composition 200 is applied layer-by-layer to said film side 110 by means of an FDM printing head 300 in an additive manufacturing process.

FIG. 2 shows the situation after conclusion of the FDM printing. That side 110 of the film 100 that has been functionalized with the layers 200 is brought into connection with a workpiece 400 which has a designated workpiece surface 410. This is depicted in the drawing by the motion of the film 100 and the workpiece 400 toward one another. That side 110 of the film 100 on which the functionalization composition 200 has been applied faces toward the workpiece 400 here.

FIG. 3 shows the situation after functionalized film 100 and workpiece 400 have been joined together. Mention may be made by way of example of a coherent bond connection between workpiece surface 410 (see FIG. 2) and film surface 110 (see FIG. 2) via hot pressing with flow of the film 100 to some extent. The contours of the layers 200 here become apparent on the surface 410 (see FIG. 2) of the functionalized workpiece 400.

What is claimed is:

1. A process for the functionalization of a workpiece surface, comprising:
    a) providing a workpiece having a workpiece surface;
    b) providing a film with at least two film sides;
    c) functionalizing at least one film side by location-selective application of a functionalization composition comprising a polymeric material via a 3D printing process in one or more layers onto at least a portion of the at least one film side to form a functionalized film side;
    d) bringing the film into contact with at least a portion of the workpiece surface for development of a coherent or interlocking connection between at least a portion of the workpiece surface and the film functionalized in step c), the coherent or interlocking connection to the workpiece surface being achieved with the functionalized film side, and wherein the functionalization is between the workpiece surface and the at least one film side,
    wherein a heat distortion temperature (HDT) measured in accordance with DIN EN ISO 75-1 to 3 method B of the printed functionalization composition is ≥5° C. and ≤200° C. higher than a heat distortion temperature of the film.

2. The process as claimed in claim 1, wherein, for the functionalization in step c), the film has been arranged to be flat.

3. The process as claimed in claim 1, wherein, before the functionalization in step c), the film is secured tautly across a mold, where a surface of the mold is a mirror image of the workpiece surface.

4. The process as claimed in claim 1, wherein a layer thickness of the printed functionalization composition is greater than a layer thickness of the film.

5. The process as claimed in claim 1, further comprising thermally processing the film during or before functionalizing in step c) at a temperature which is in a range of 5° C. below Tg to 200° C. above the glass transition temperature (Tg) of the film.

6. The process as claimed in claim 1, wherein the 3D printing process in step c) is selected from fused filament fabrication (FFF) processes, inkjetting processes, or selective laser sintering (SLS) processes.

7. The process as claimed in claim 1, wherein the polymeric material of the functionalization composition is selected from the group consisting of polyurethane, polycarbonate, polyesters, polyamide, polyetherimide, polyetherketone, polyimide, polyoxymethylene, polysilicone, thermoplastic elastomers, polyurethane, polyacrylate-containing thermoset materials, and mixtures thereof.

8. The process as claimed in claim 1, wherein the coherent or interlocking connection between workpiece surface and functionalized film is achieved by way of a thermoforming step.

9. The process as claimed in claim 8, wherein before or during the thermoforming step the functionalized film is heated to a temperature that is ≥5° C. above a heat distortion temperature of the functionalized film.

10. The process as claimed in claim 1, wherein before step d) a tie layer is provided to the functionalized film side and/or to the workpiece surface at least to some extent at a site of contact between the film and the workpiece.

11. The process as claimed in claim 1, wherein the functionalization composition further comprises functionalized additions selected from the group consisting of conductive materials, dyes, pigments, fillers, fibers, and mixtures of at least two thereof.

12. The process as claimed in claim 1, wherein functionalizing the film in step c) comprises applying pins, hooks, eyes or guide elements to the film by printing.

13. A workpiece with a functionalized surface, produced by a process as claimed in claim 1.

14. The workpiece as claimed in claim 13, wherein the workpiece is an interior component of a vehicle selected from the group consisting of an aircraft, a rail vehicle, and a motor vehicle.

* * * * *